J. BRENZINGER.
CAN BODY SIDE SEAM SOLDERING MACHINE.
APPLICATION FILED JAN. 31, 1919.

1,349,044.

Patented Aug. 10, 1920.
4 SHEETS—SHEET 1.

Fig. 1.

Inventor
Julius Brenzinger
By his Attorney

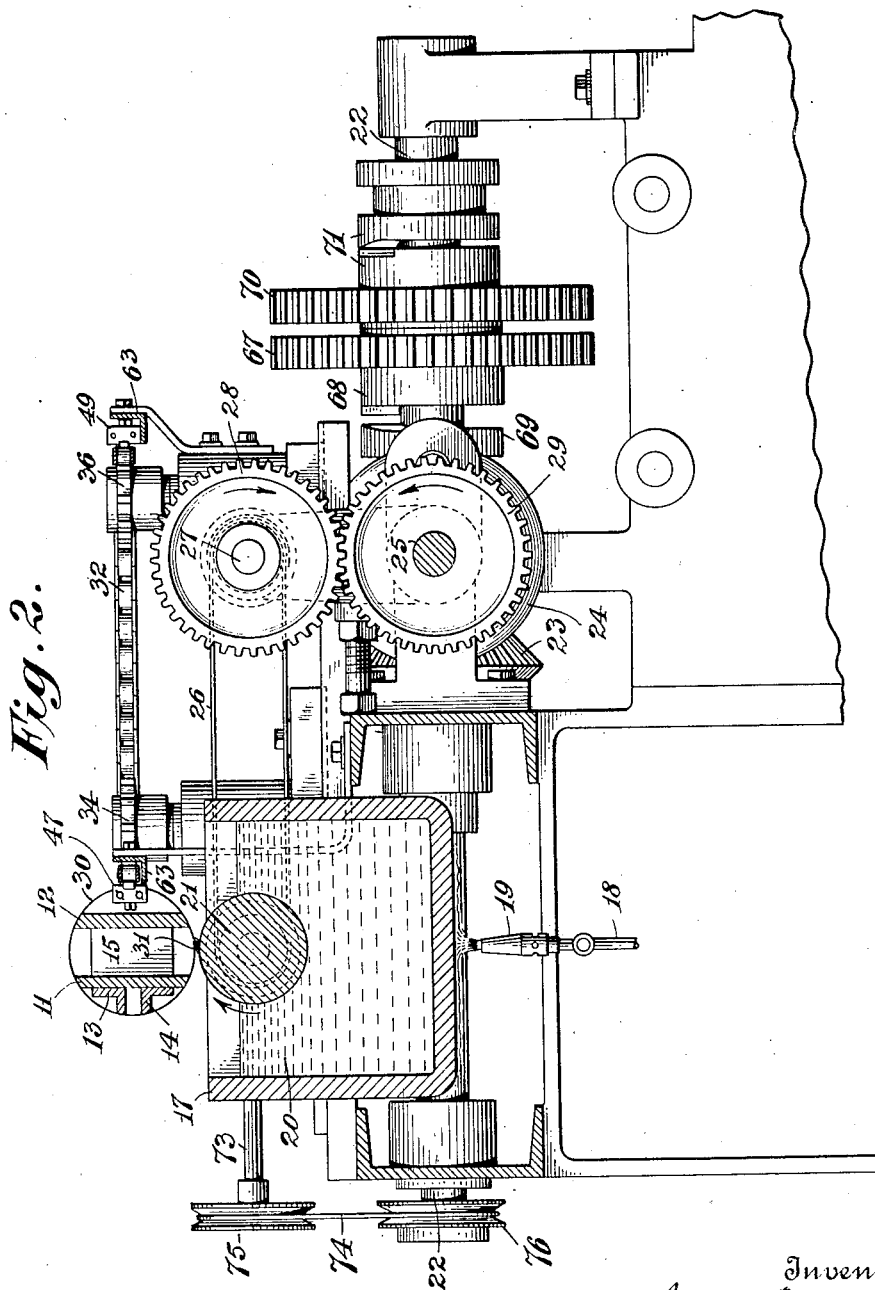

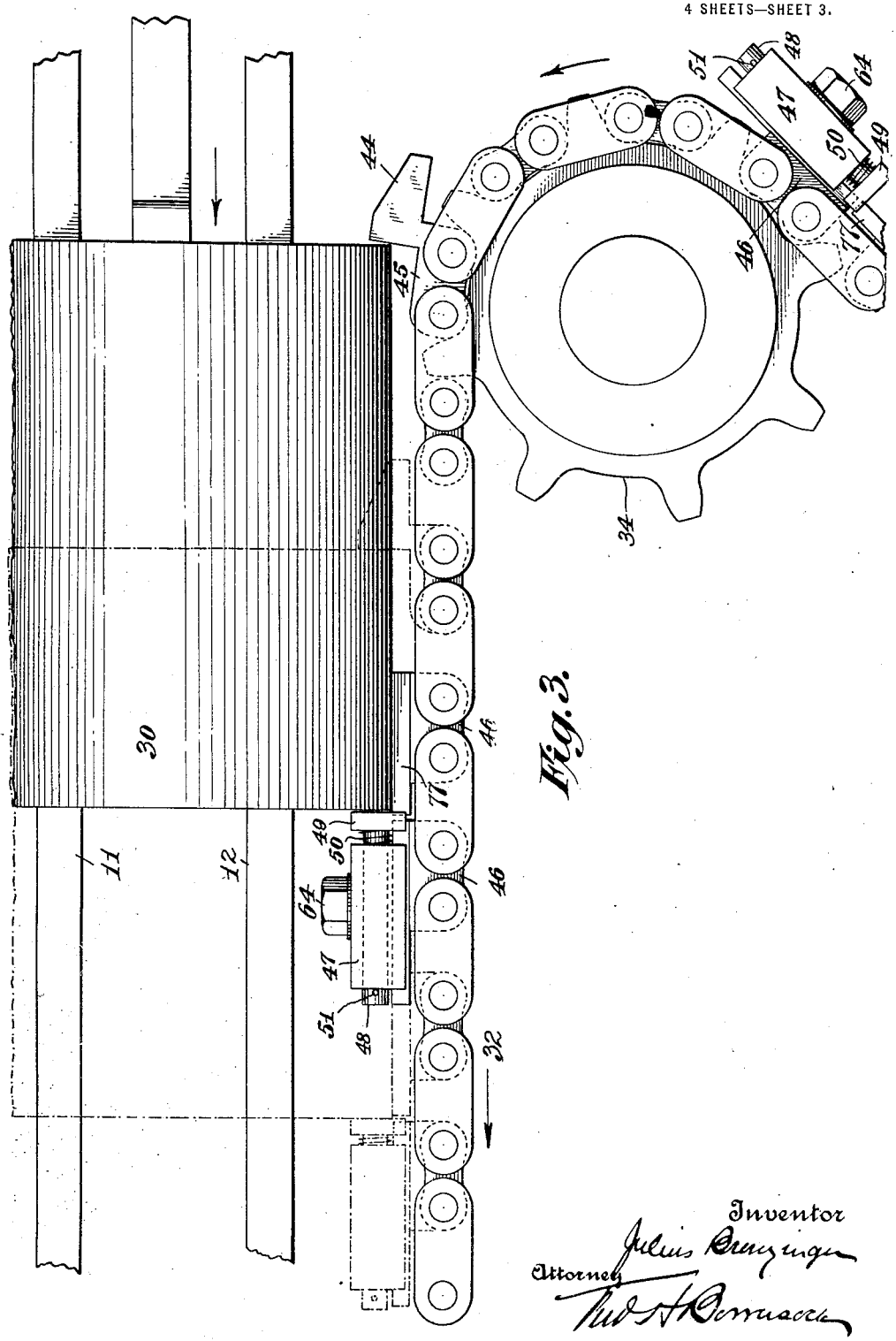

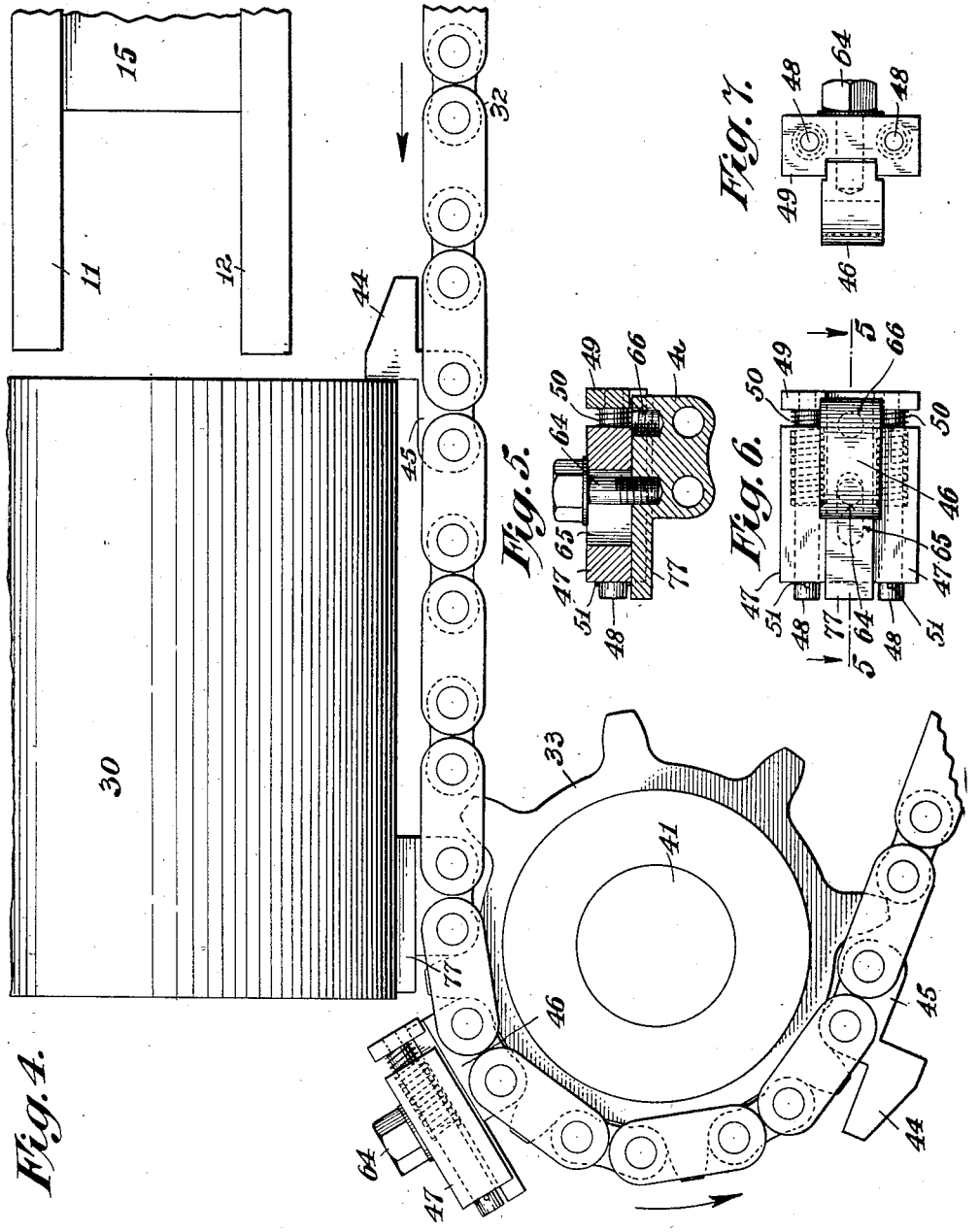

UNITED STATES PATENT OFFICE.

JULIUS BRENZINGER, OF FAIRFIELD, CONNECTICUT, ASSIGNOR TO THE MAX AMS MACHINE CO., OF BRIDGEPORT, CONNECTICUT, A CORPORATION OF NEW YORK.

CAN-BODY-SIDE-SEAM-SOLDERING MACHINE.

1,349,044.

Specification of Letters Patent. Patented Aug. 10, 1920.

Application filed January 31, 1919. Serial No. 274,194.

*To all whom it may concern:*

Be it known that I, JULIUS BRENZINGER, a citizen of the United States, residing at Fairfield, in the county of Fairfield and State of Connecticut, have invented certain new and useful Improvements in Can-Body-Side-Seam-Soldering Machines, of which the following is a specification.

This invention relates generally to machines for making the usually cylindrical body portions of sheet metal containers, commonly known as tin cans, with more particular reference to machines for applying solder to the side seams of the formed bodies.

In the manufacture of modern so-called "sanitary" cans, effort is made to eliminate solder, so far as possible or practicable, particularly from the interior of the can where it would come in contact with the contents thereof. The body portion of the can is formed from a flat sheet-metal blank having a hook at each end thereof, and in the forming operation these ends are interhooked and the overlapping layers compressed to provide a tight seam. The end or top and bottom portions are secured to the body portion of the can by what is known as the double seaming process, and by this process overlying layers of metal are intercurled and a permanently tight seam produced without the employment of solder. In the side seam, however, the metal layers are merely interhooked and compressed, and it is therefore much more difficult to provide a tight and substantially permanent seam without solder. The solder is applied, however, on the outside of the can body, entering the interstices between the exterior layers and not penetrating to the interior surfaces.

There are doubtless many ways by which solder may be exteriorly applied to this so-called interlocked side seam, probably one of the most satisfactory for all purposes being by means of a rotating roller which dips into a tank of molten solder, the can body being advanced along said roller with the seam in contact therewith, whereby the film of solder which adheres to the cylindrical face of the roller is scraped therefrom and into the interstices of the exterior portion of the seam. The only serious objection to this method of applying the solder is that the friction generated between the rotating roller and the advancing can body has a tendency to and often does rotate the latter on its support, thereby carrying the side seam out of contact with the roller and consequently causing a useless deposit of solder along a wrong line. The principal object of the present invention is the provision of means, in a machine of this character, or in the side-seam soldering apparatus of a machine of this character, for preventing rotation of the can body while in transit along the solder-depositing roller.

My invention will be more readily understood by reference to the accompanying drawings, forming a part of this specification, in which I have illustrated a practical and convenient embodiment of the invention, and in which—

Figure 1 is a top plan view of a can-body side-seam soldering machine embodying my invention;

Fig. 2 is an enlarged vertical cross-section of the same, taken substantially on the line 2—2 of Fig. 1;

Fig. 3 is an enlarged detail plan view of a portion of the machine, showing the method of clamping the can body to the conveyer chain, the former being in the position where it is initially engaged by the clamps on the chain, the fully clamped position being indicated by the dotted lines;

Fig. 4 is a somewhat similar view, showing the can in the position in which it is released from the clamps and about to be delivered from the machine after the soldering operation;

Fig. 5 is a longitudinal vertical section of one of the flexible clamp members, taken substantially on the line 5—5 of Fig. 6;

Fig. 6 is a bottom plan view of the same, and

Fig. 7 is an end view thereof.

It is to be understood that the machine of my present invention is primarily designed to form a link in a chain of machines so interconnected as to receive a flat blank, bend the ends thereof so as to provide oppositely-disposed hooks, form the same over a suitable mandrel and at the same time interhook the ends of the blank, compress the interhooked portions into a substantially solid seam, and apply solder to the exterior parts of the seam—possibly, also, passing the now formed can body on to an end-flanging machine and thence to a heading machine. I have more particularly in mind a machine such as that shown and described in Patent No. 1,200,190, to Paul R. Hahnemann, dated October 3, 1916, in which means including a yieldingly contractile mandrel are provided for forming the can body from a flat sheet-metal blank, interhooking the hooked ends thereof, compressing the interhooked ends to form a seam, and ejecting the formed can body from the mandrel.

Projecting from and supported at one end by this forming mandrel is what may be termed a track which includes the guide-rails 11 and 12 with supplemental angle-rails 13 and 14 secured to the former, adapted to receive the formed can body from said mandrel and guide its further advancement. The rails 11 and 12 are spaced apart by blocks 15 15 located at intervals throughout the length of said rails, and said track as a whole is supported at its other end upon a roller 16 (preferably driven in a manner and for a purpose which will be hereinafter set forth) whereby the can body may pass between the track and said roller in transit to the discharge end of said track.

The machine of my invention, of course, includes a suitable supporting frame, mounted at one end of which is an elongated tank 17 adapted to contain molten solder. A pipe 18, leading from any suitable source of supply of inflammable gas, terminates in a burner 19 whereby the contents of the tank 17 may be kept in a heated and therefore molten condition. Rotatively mounted to dip into the molten solder 20 in the tank 17 is the roller 21. Obviously, upon rotation of said roller, a film of molten solder will adhere thereto and be carried upwardly thereby.

Suitably journaled in the frame of the machine is the driving shaft 22 which is actuated in a manner to be hereinafter described. Mounted on this shaft is the bevel gear 23 the teeth of which are in mesh with the teeth of the similar gear 24 on the shaft 25. The roller 21 is rotated from the shaft 25 by means of a belt 26 passing around pulleys on the axle of said roller and the short shaft 27, respectively, the latter being driven from the shaft 25 by means of the intermeshed gears 28 and 29. The tank 17 is located near that end of the track upon which the can bodies are received from the mandrel, and the roller 21 is so positioned and adjusted relative to said track that as the can body 30 is advanced the side seam 31 is in contact with said roller, as shown in Fig. 2.

To advance the can bodies along said track, I provide the endless conveyer-chain 32 passing around sprockets 33, 34, 35 and 36 suitably mounted on the frame of the machine. Mounted at the end of the shaft 25 is the bevel gear 37 in mesh with a similar gear 38 on a shaft 39. The shaft 39 carries the spiral 40 from which the sprocket shaft 41 is driven through the interposition of the gear 42 and the pinion 43, the latter being in mesh with a gear on said sprocket shaft, as clearly shown in Fig. 1.

It will be apparent that in order that the can bodies may travel freely along the track, they must be loose thereon, and, if loose, and pressed with sufficient force against the roller 21 to effect the proper application of solder to the seam 31, the rotating roller will tend through friction to displace the seam through rotation of the can body. Therefore, I have found that it will not suffice merely to provide the chain 32 with lugs adapted to engage the ends of the can bodies in a common and well-known manner to advance the latter, but that the can bodies must be engaged in such manner as to hold them against rotation on the track. For this purpose, in addition to the ordinary pusher-lugs 44 44 with which certain links 45 45 of the chain are provided, at suitable intervals, I mount upon certain other links 46 46, in advance of the links 45 45, respectively, blocks 47 47. Each of these blocks is provided with longitudinal bores for the small plunger-rods 48 48 carrying the presser-heads 49 49 under pressure of the compression springs 50 50 on the rods 48 48, pins 51 51 on said rods limiting movement of said head under action of the springs.

When the formed can body is ejected from the mandrel, it is delivered to a position substantially as indicated in Fig. 3 and at the same velocity as that of the moving chain 32. The block 47 is so positioned and adjusted relative to the ejecting device that it immediately precedes a can body in process of ejectment, the end of the latter being contiguous to the yielding head 49 of the block. The lug 44 is so positioned relative to the block 47 in advance thereof that the distance between the head 49 and said lug is slightly less than the length of the can body, wherefore the latter may be yieldingly clamped between said head and said lug. The lug, being at a greater distance from the center of the sprocket 34 than the link 45 of which it forms a part, in rounding the curve travels a greater distance and consequently at a higher velocity than the chain, wherefore the can body, near the end of its movement under action of the ejecting mechanism, is followed by the more rapidly moving lug which now engages the end of said body and forces the other end thereof against the yielding head 49, thus clamping said body against rotation on its track under the frictional forces of the rotation roller 21. The track is continued for some distance beyond the end of the roller 21 in order that the solder may have time to cool to the point of solidification before discharge of the soldered can body.

Journaled in bearings at the ends of arms or brackets 52 52 suitably mounted on the frame of the machine is a shaft 53 carrying the rotary brush 54. This brush is so located relative to the track that the upper edge thereof contacts with the soldered portion of an advancing can body immediately following the soldering operation for the purpose of rubbing or wiping off any surplus or misplaced solder. This brush is rotated in a direction opposite to that of the advancing can body by means of a belt 55 passed around a pulley 56 on the shaft 53 and a pulley 57 on a shaft 58, the latter being driven by means of the intermeshed bevel gears 59 and 60 on said shaft 58 and the shaft 25, respectively.

The track-supporting roller 16 has a peripheral configuration substantially complemental to that of the can body, so that the latter will pass readily between said roller and the track, slightly elevating the latter. This operation is facilitated by positively rotating said roller by means of a gear 61 on the roller-shaft in mesh with a pinion 62 on the shaft 58.

I have shown the longer legs of the chain 32 slidably supported on angle-bars 63 in order to prevent the undue sagging of the chain which would otherwise occur.

In order to adapt my machine for the soldering of the side seams of can bodies of different lengths, I make the block 47 adjustable on the link 46 through the usual pin (64) and slot (65) connection, the range of adjustment being further amplified by providing a second socket 66 for the pin 64.

The shaft 22 is driven by means of a gear 67 connected in the usual manner to any suitable and convenient source of power. This gear 67 with its hub 68 is loose on the shaft 22, the hub 68 forming one of a pair of clutch members of which the other 69 is keyed to the shaft. The gear 67 rotates continuously and will rotate the shaft when the clutch is closed.

A similar gear 70, also loose upon the shaft 22 and adapted to be secured to said shaft by means of a similar clutch 71, has connection with the forming and ejecting mechanism to drive the same. It will be apparent that operation of the soldering mechanism must be continued after operation of the forming and ejecting mechanism has been stopped in order to clear the track of the soldered bodies. Therefore, when the desired number of bodies have been formed, the clutch 71 is released, the soldering mechanism continuing to operate until release of the clutch 68—69 when the track has been cleared.

Before reaching the soldering roller 21, the can bodies pass over a fluxing roller 72 mounted at the end of a short shaft 73 driven from the shaft 22 by means of the driving-rope 74 passing around the grooved pulleys 75 and 76 on said shafts, respectively.

Many modifications of minor details of my improved can-body side-seam soldering machine will doubtless readily suggest themselves to those skilled in the art to which it appertains, and I therefore do not desire to limit my invention to the specific construction herein shown and described.

I claim—

1. In a machine of the character described, the combination, with means for applying solder to the side seam of a can body in transit, of means for advancing said can body which at the same time yieldingly engages the same at each end thereof to prevent rotation during advancing movement.

2. In a machine of the character described, the combination, with means for applying solder to the side seam of a can body in transit, of an endless conveyer, said conveyer being provided with means for advancing said can body and with means coöperating with said advancing means for yieldingly clamping said can body endwise therebetween to prevent rotation thereof during advancing movement.

3. In a machine of the character described, the combination, with means for applying solder to the side seam of a can body in transit, said means comprising a tank of molten solder and a rotating roller dipping thereinto, of means for advancing said can body along said roller with said seam in contact therewith, and means coöperating with said advancing means for yieldingly clamping said can body endwise therebetween to prevent rotary movement thereof.

4. In a machine of the character described, the combination, with means for applying solder to the side seam of a can body in transit, said means comprising a tank of molten solder and a rotating roller dipping into the same, of an endless conveyer, said conveyer being provided with means for advancing said can body along said roller with said seam in contact therewith and with means coöperating therewith for clamping said body endwise therebetween to prevent rotary movement thereof during the solder-applying operation.

5. In a machine of the character described, the combination, with means for applying solder to the side seam of a can body in transit, said means comprising a tank of molten solder and a rotating roller dipping into the same, of an endless conveyer, said conveyer being provided with means for advancing said can body along said roller with said seam in contact therewith and with means coöperating with said advancing means for yieldingly clamping said can body endwise therebetween to prevent rotary movement of said body during the solder-applying operation.

6. In a machine of the character described, the combination, with means for applying solder to the side seam of a can body in transit, and a track for supporting and guiding said body in movement to, through and away from said applying means, of means for advancing said body along said track which at the same time yieldingly engages said body at each end thereof to prevent rotation of said body relative to said applying means.

7. In a machine of the character described, the combination, with means for applying solder to the side seam of a can body in transit, and a track for interiorly supporting and guiding said body to, through and away from said applying means, of means for advancing said body along said track, and means coöperating therewith for yieldingly clamping said body endwise therebetween to prevent rotation thereof relative to said applying means.

8. In a machine of the character described, the combination, with means for applying solder to the side seam of a can body in transit, and a track for supporting and guiding said body in movement to, through and away from said applying means, of an endless conveyer, said conveyer being provided with means for advancing said body along said track and with means coöperating therewith for clamping said body endwise therebetween to prevent rotation thereof relative to said applying means.

9. In a machine of the character described, the combination, with means for applying solder to the side seam of a can body in transit, and a track for supporting and guiding said body in movement to, through and away from said applying means, of an endless conveyer, said conveyer being provided with means for advancing said body along said track and with means coöperating with said advancing means for yieldingly clamping said can body endwise therebetween to prevent rotation of said body relative to said applying means.

10. In a machine of the character described, the combination, with means for applying solder to the side seam of a can body in transit, said means comprising a tank of molten solder and a roller dipping thereinto, and a track for supporting and guiding said body in movement to, through and away from said applying means, of means for advancing said body along said track, and means coöperating therewith for yieldingly clamping said body endwise therebetween to prevent rotation thereof relative to said applying means.

11. In a machine of the character described, the combination, with means for applying solder to the side seam of a can body in transit, said means comprising a tank of molten solder and a roller dipping thereinto, and a track for supporting and guiding said body in movement to, through and away from said applying means, of an endless conveyer, said conveyer being provided with means for advancing said body along said track and with means coöperating therewith for clamping said body endwise therebetween to prevent rotation thereof relative to said applying means.

12. In a machine of the character described, the combination, with means for applying solder to the side seam of a can body in transit, said means comprising a tank of molten solder and a rotating roller dipping thereinto, and a track for supporting and guiding said body in movement to, through and away from said applying means, of an endless conveyer, said conveyer being provided with means for advancing said body along said track and with means coöperating with said advancing means for yieldingly clamping said can body endwise therebetween to prevent rotation thereof relative to said applying means.

13. In a machine of the character described, the combination, with means for successively applying solder to the side seams of can bodies in transit, and a track for supporting and guiding said bodies in movement to, through and away from said applying means, of an endless conveyer provided with members for engaging and pushing said bodies along said track and with yielding abutments against which the other ends of said bodies are adapted to impinge to clamp said bodies endwise between said members and said abutments to prevent rotation of the advancing can bodies relative to said applying means.

In testimony of the foregoing, I have hereunto set my hand in the presence of two witnesses.

JULIUS BRENZINGER.

Witnesses:
TIMOTHY O. ERG,
L. D. JONES.